US011453449B2

(12) United States Patent
Ford, Jr.

(10) Patent No.: US 11,453,449 B2
(45) Date of Patent: Sep. 27, 2022

(54) SUPPORT FRAME ASSEMBLY TO ENHANCE HIGH-SPEED STABILITY FOR A NARROW TRACK VEHICLE DURING TURNS

(71) Applicant: Stephen Joseph Ford, Jr., Houston, TX (US)

(72) Inventor: Stephen Joseph Ford, Jr., Houston, TX (US)

( * ) Notice: Subject to any disclaimer, the term of this patent is extended or adjusted under 35 U.S.C. 154(b) by 274 days.

(21) Appl. No.: 16/584,511

(22) Filed: Sep. 26, 2019

(65) Prior Publication Data

US 2020/0108881 A1 Apr. 9, 2020

Related U.S. Application Data

(60) Provisional application No. 62/741,400, filed on Oct. 4, 2018.

(51) Int. Cl.

| | |
|---|---|
| ***B62H 1/10*** | (2006.01) |
| ***B62K 19/18*** | (2006.01) |
| ***B62K 3/00*** | (2006.01) |
| ***B62K 5/10*** | (2013.01) |

(52) U.S. Cl.

CPC ............... *B62H 1/10* (2013.01); *B62K 3/005* (2013.01); *B62K 5/10* (2013.01); *B62K 19/18* (2013.01); *B62K 2201/04* (2013.01)

(58) Field of Classification Search

CPC .......... B62H 1/10; B62K 3/005; B62K 19/18; B62K 2201/04; B62K 5/06; B62K 5/10

See application file for complete search history.

(56) References Cited

U.S. PATENT DOCUMENTS

| | | | | |
|---|---|---|---|---|
| 6,203,043 B1 * | 3/2001 | Lehman | B62K 3/005 | 280/124.136 |
| 6,328,125 B1 * | 12/2001 | Van Den Brink | B62D 61/08 | 180/211 |
| 2007/0029751 A1 * | 2/2007 | Marcacci | B62K 5/08 | 280/124.1 |
| 2007/0193815 A1 * | 8/2007 | Hobbs | B62K 5/10 | 180/348 |
| 2008/0012262 A1 * | 1/2008 | Carabelli | B62K 5/10 | 280/124.106 |
| 2008/0238005 A1 | 10/2008 | James | | |
| 2009/0312908 A1 | 12/2009 | Van Den Brink | | |

(Continued)

*Primary Examiner* — Jacob D Knutson
*Assistant Examiner* — Abigail R Hymel
(74) *Attorney, Agent, or Firm* — Plager Schack LLP; Mark H. Plager; Naomi Mann

(57) ABSTRACT

A support frame assembly mounted to a narrow track vehicle to enhance stability during turns is provided. The support frame assembly includes a pivot frame assembly coupled to the narrow track vehicle and having a horizontal beam connected to a vertical beam, the horizontal beam supporting the seat of the narrow track vehicle thereon, a fixed frame assembly coupled to the narrow track vehicle and having a horizontal beam pivotably mounted to the vertical beam of the pivot frame assembly, and a pair of struts coupled to the pivot frame assembly and fixed frame assembly. The pair of struts apply counteracting forces on the vertical beam of the pivot frame assembly in response to pivotal movement of the pivot frame assembly relative to the fixed frame assembly.

5 Claims, 3 Drawing Sheets

(56) References Cited

U.S. PATENT DOCUMENTS

2010/0270765 A1* 10/2010 Choi ........................ B62D 9/02
280/93.51
2011/0006498 A1* 1/2011 Mercier ................... B62K 5/10
280/124.103
2012/0098220 A1* 4/2012 Yu ............................ B62K 5/08
280/62
2012/0098225 A1* 4/2012 Lucas ...................... B62K 5/10
280/124.103
2014/0172286 A1* 6/2014 Moulene .................. B62K 5/10
701/124

* cited by examiner

SUPPORT FRAME ASSEMBLY TO ENHANCE HIGH-SPEED STABILITY FOR A NARROW TRACK VEHICLE DURING TURNS

RELATED APPLICATION

The application claims priority to provisional patent application U.S. Ser. No. 62/741,400 filed on Oct. 4, 2018, the entire contents of which is herein incorporated by reference.

BACKGROUND

The embodiments herein relate generally to narrow track vehicles. More specifically, embodiments of the invention are directed to a support frame assembly mounted to a narrow track vehicle to enhance stability during high-speed turns.

Narrow track vehicles such as delta configuration recumbent or semi-recumbent tricycles have a tendency to overturn during high-speed turns. This poses safety concerns to the driver and passenger of the vehicle, which may lead to injury or death of these individuals. Several existing narrow track vehicles use components such as powered actuators to help tilt and maintain the vehicle in the upright position at variable speeds. However, these components add significant weight and complexity to the vehicle among several disadvantages.

As such, there is a need in the industry for a support frame assembly for use with a narrow track vehicle that addresses the limitations of the prior art, which provides a simple and lightweight solution that enhances stability of the vehicle during high-speed turns.

SUMMARY

In certain embodiments of the invention, a support frame assembly mounted to a narrow track vehicle to enhance high-speed stability during turns is provided. The narrow track vehicle comprises a seat for supporting a user. The support frame assembly comprises a pivot frame assembly coupled to the narrow track vehicle and comprising a generally horizontal beam continuously connected to a generally vertical beam, the horizontal beam supporting the seat of the narrow track vehicle thereon, a fixed frame assembly coupled to the narrow track vehicle and comprising a generally horizontal beam pivotably mounted to the vertical beam of the pivot frame assembly, the horizontal beam of the fixed frame assembly configured to permit pivotal movement of the pivot frame assembly relative to the fixed frame assembly, and a pair of struts coupled to the pivot frame assembly and fixed frame assembly, each strut in the pair of struts comprising a first end coupled to the vertical beam of the pivot frame assembly and a second end coupled to the horizontal beam of the fixed frame assembly, wherein the pair of struts apply counteracting forces on the vertical beam of the pivot frame assembly in response to pivotal movement of the pivot frame assembly relative to the fixed frame assembly.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
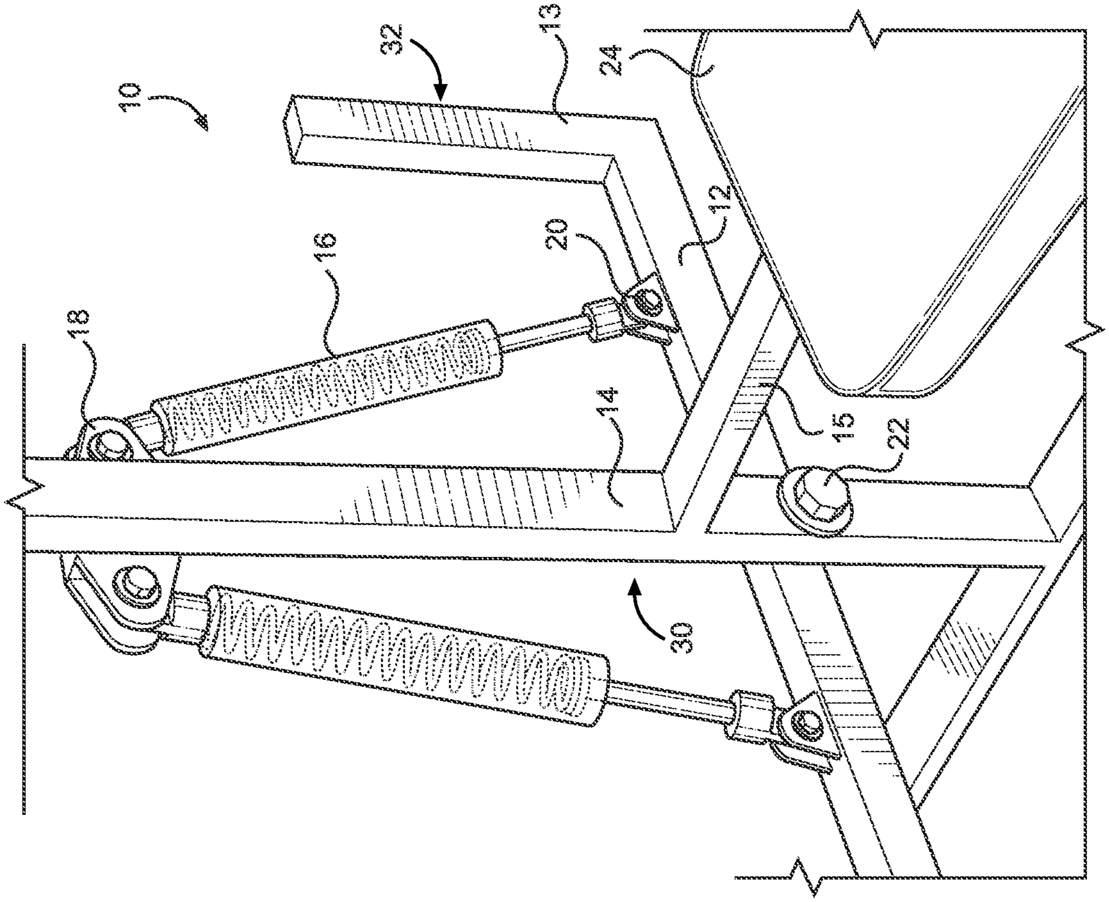
FIG. 1 depicts a perspective view of certain embodiments of the support frame assembly.
Figure 2:
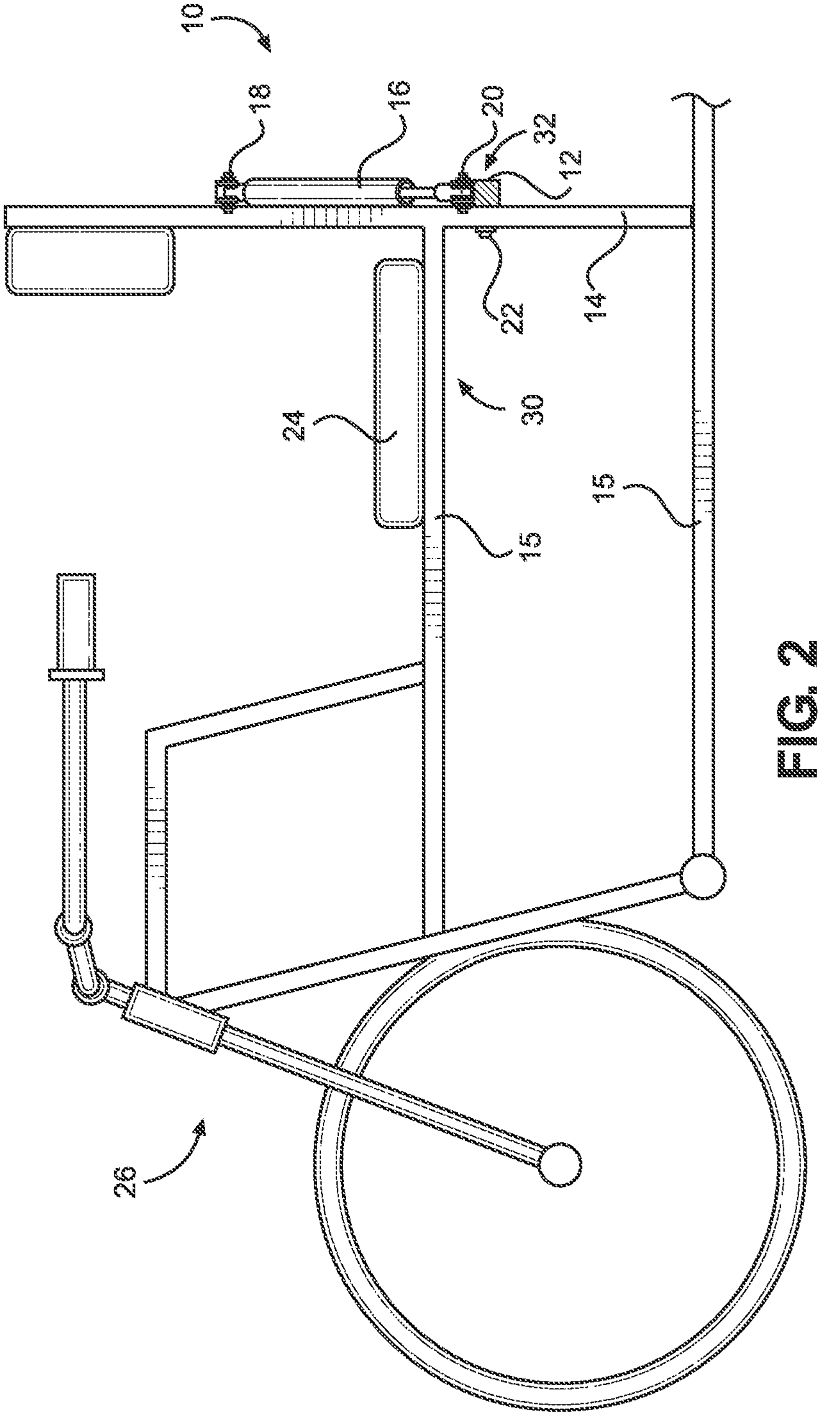
FIG. 2 depicts a side view of certain embodiments of the support frame assembly on the narrow track vehicle.
Figure 3B:
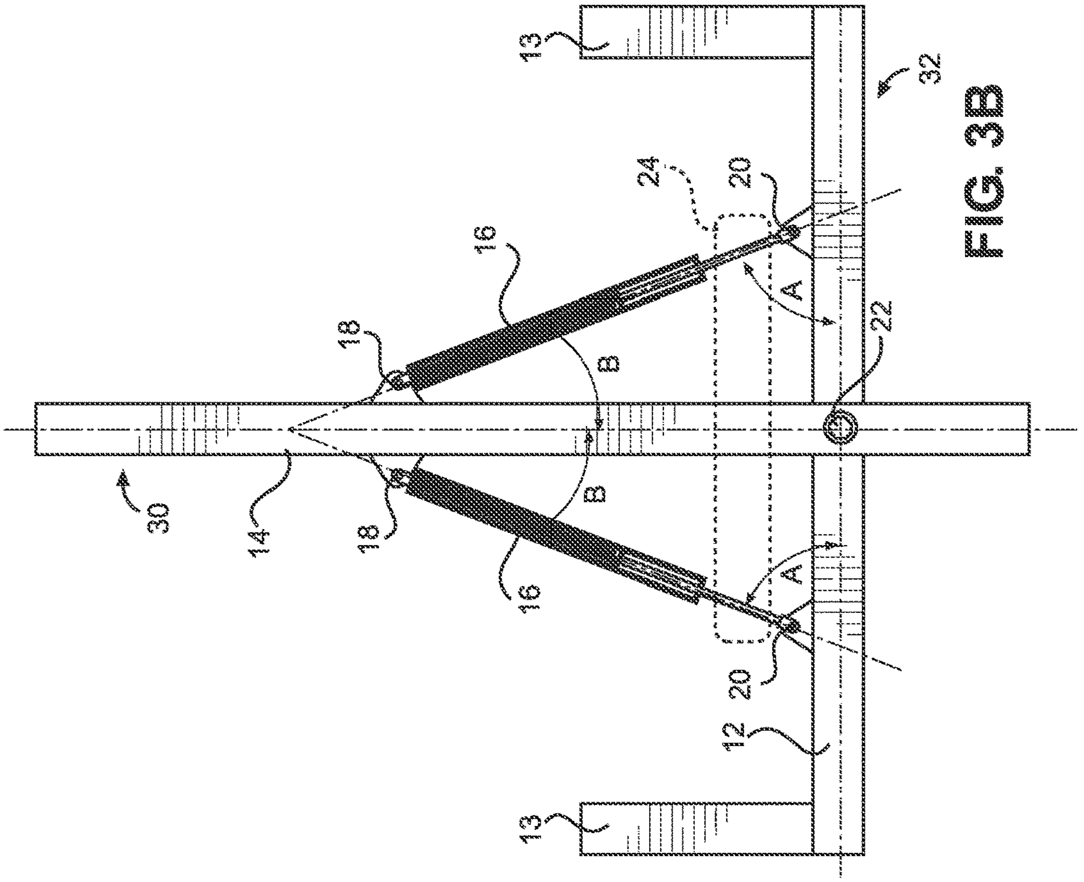
FIG. 3B depicts a rear view of certain embodiments of the support frame assembly in an upright neutral position.
Figure 3A:
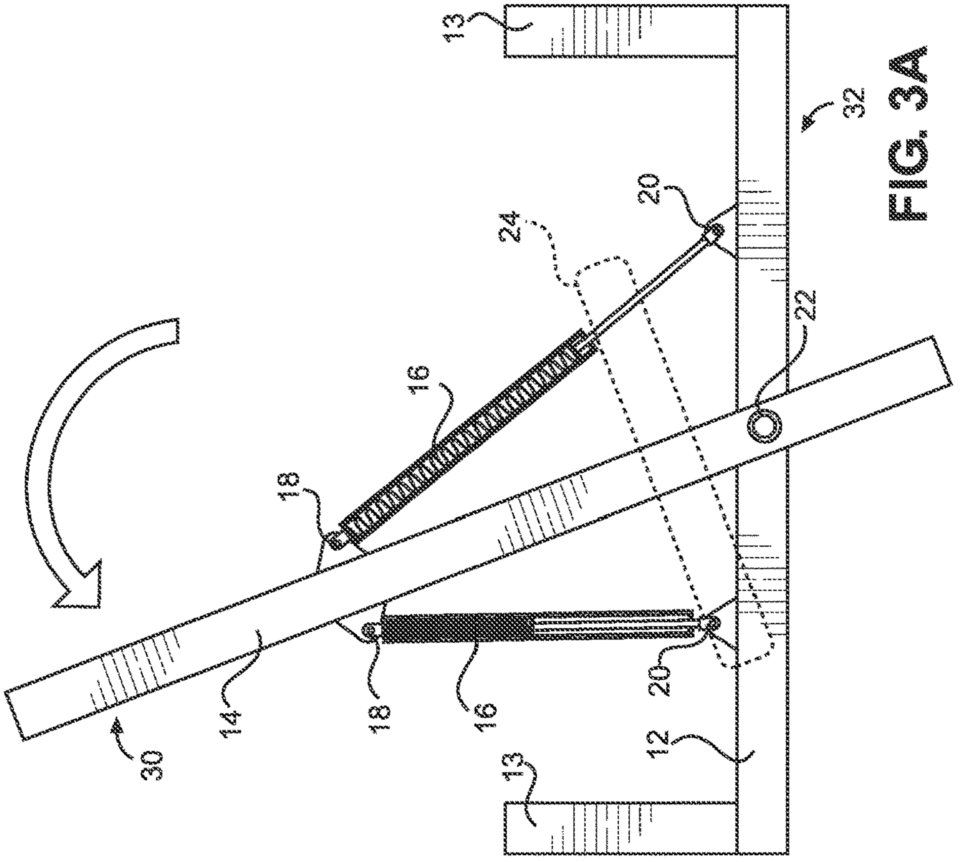
FIG. 3A depicts a rear view of certain embodiments of the support frame assembly shown in use.

In certain embodiments of the invention as depicted in FIGS. 1-3, support frame assembly 10 is mounted to narrow track vehicle 26 to enhance stability of the vehicle, especially during turns at high-speeds. Narrow track vehicle 26 is preferably a delta configuration recumbent or semi-recumbent tricycle, but can be any alternative type of vehicle known in the field. In certain embodiments, support frame assembly 10 generally comprises pivot frame assembly 30 and fixed frame assembly 32 mounted to the existing frame of narrow track vehicle 26.

It shall be appreciated that narrow track vehicle 26 such as a delta configuration recumbent or semi-recumbent tricycle comprises components known in the field including at least a main frame, front wheel, rear wheels, steering mechanism, drive train, sprocket, chains, links, differential and the like. For simplicity and illustrative purposes, all of these existing components on the tricycle are not illustrated in the figures and focus is directed to support frame assembly 10.

In certain embodiments as depicted in FIGS. 1-2, pivot frame assembly 30 of support frame assembly 10 is coupled to the main frame of narrow track vehicle 26 and generally comprises horizontal beams 15 connected to vertical beam 14. In one embodiment, a first horizontal beam 15 is continuously connected to vertical beam 14 and is configured to support seat 24 thereon. Seat 24 is coupled to horizontal beam 15 by mechanical fasteners or other types of connectors. In one embodiment, a second horizontal beam 15 is coupled to vertical beam 14.

Vertical beam 14 and horizontal beams 15 of pivot frame assembly 30 are made from any materials known in the field including, but not limited to, steel, aluminum, titanium, carbon fiber, wood or other materials. In an alternative embodiment, the members of pivot frame assembly 30 are made from tubular members.

In certain embodiments as depicted in FIGS. 1-3, fixed frame assembly 32 is pivotably mounted to pivot frame assembly 30 and generally comprises horizontal beam 12 and a pair of vertical beams 13. In one embodiment, the pair of vertical beams 13 is welded to opposing ends of horizontal beam 12 or coupled thereto using alternative fasteners. In an alternative embodiment, the pair of vertical beams 13 is continuously connected to opposing ends of horizontal beam 12.

Horizontal beam 12 and vertical beams 13 of fixed frame assembly 32 are made from any materials known in the field including, but not limited to, steel, aluminum, titanium, carbon fiber, wood or other materials. In an alternative embodiment, the members of fixed frame assembly 32 are made from tubular members.

In one embodiment, horizontal beam 12 is connected to components including the rear wheels and/or certain drive components of narrow track vehicle 26. Fixed frame assembly 32 is configured to remain stationary relative to the rear wheels of narrow track vehicle 26, which are in contact with the ground.

In one embodiment as depicted in FIGS. 1-3, vertical beam 14 of pivot frame assembly 30 is coupled to horizontal beam 12 of fixed frame assembly 32 at pivot 22. In a preferred embodiment, pivot 22 is located at the midpoint of horizontal beam 12 of fixed frame assembly 32. In one embodiment, pivot 22 comprises a bearing, bolt or other components configured to allow vertical beam 14 of pivot frame assembly 30 to pivot relative to horizontal beam 12 of fixed frame assembly 32.

In a preferred embodiment as depicted in FIG. 3B, a pair of struts 16 is coupled to pivot frame assembly 30 and fixed frame assembly 32. Specifically, the pair of struts 16 is positioned on opposing sides of vertical beam 14 of pivot frame assembly 30. Each strut 16 comprises a first end coupled to vertical beam 14 of pivot frame assembly 30 and a second end coupled to horizontal beam 12 of fixed frame assembly 32. In one embodiment, the first end of each strut 16 is pivotably mounted to vertical beam 14 of pivot frame assembly 30 at upper pivot point 18 and the second end of each strut 16 is pivotably mounted to horizontal beam 12 of fixed frame assembly 32 at lower pivot point 20. Upper and lower pivot points 18, 20 may comprise any components that permit strut 16 to pivot relative to vertical beam 14 of pivot frame assembly 30 or horizontal beam 12 of fixed frame assembly 32.

As depicted in FIG. 3, the oppositely oriented struts 16 allow the struts to apply counteracting forces on vertical beam 14 of pivot frame assembly 30 in response to pivotal movement of pivot frame assembly 30 relative to fixed frame assembly 32.

In one embodiment as depicted in FIG. 3B, pivot frame assembly 30 is in the upright neutral resting position relative to fixed frame assembly 32. In this position, each strut 16 comprises a longitudinal axis that is oriented an angle A relative to the longitudinal axis of horizontal beam 12 of fixed frame assembly 32 where angle A is equal to approximately 66 degrees. In this position, each strut 16 comprises a longitudinal axis that is oriented an angle B relative to the longitudinal axis of vertical beam 14 of pivot frame assembly 30 where angle B is equal to approximately 24 degrees. In alternative embodiments, angles A and B may vary to accommodate the size and type of narrow track vehicle 26.

Struts 16 can have variable specifications. In one embodiment, each strut 16 comprises a rod diameter of 0.55", body diameter of 1.10", stroke of 6.02", base cylinder length of 18.82", compressed length of 12.83", initial force of +/−10% of 70 lb and final force of +/−10% of 212 lb. However, it shall be appreciated that the specifications and materials of struts 16 can vary to accommodate the size and type of narrow track vehicle 26.

In operation, the operator of narrow track vehicle 26 is seated on seat 24. Narrow track vehicle 26 is operated in the conventional manner. During a turn, the operator uses his/her body weight to lean narrow track vehicle 26 laterally in the desired steering direction against the counteracting force(s) from one or both struts 16. As a result, each strut 16 is configured to provide counteracting support to the lateral pivotal movement of pivot frame assembly 30 relative to fixed frame assembly 32.

This enables the operator to complete the turn on narrow track vehicle 26 with enhanced stability. Upon the completion of the turn, the operator leans his/her body in the opposite direction to adjust pivot frame assembly 30 to the upright neutral position relative to fixed frame assembly 32. This process is repeated with the operator leaning laterally in either direction as needed to enhance the stability of narrow track vehicle 26 when in motion, particularly during high-speed turns.

In a preferred embodiment, support frame assembly 10 is configured to facilitate lateral movement of a 200 lb operator on seat 24 with struts 16 permitting pivotal movement of vertical beam 14 of pivot frame assembly 30 within the range of approximately +/−20 degrees relative to fixed frame assembly 32 from the upright neutral position. However, it shall be appreciated that modifications to narrow track vehicle 26, struts 16 and the mounting locations of the components can vary the range of motion permitted by support frame assembly 10.

It shall be appreciated that the components of the support frame assembly described in several embodiments herein may comprise any alternative known materials in the field and be of any color, size and/or dimensions. It shall be appreciated that the components of the support frame assembly described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A support frame assembly mounted to a narrow track vehicle to enhance high-speed stability during turns, the narrow track vehicle comprising a seat for supporting a user, a front wheel, and rear wheels, the support frame assembly comprising:

a pivot frame assembly coupled to the narrow track vehicle and comprising a horizontal beam continuously connected to a continuous vertical beam, the horizontal beam supporting the seat of the narrow track vehicle thereon;

a fixed frame assembly coupled to the narrow track vehicle and comprising a horizontal beam pivotably mounted to the vertical beam of the pivot frame assembly, the horizontal beam of the fixed frame assembly configured to permit pivotal movement of the pivot frame assembly relative to the fixed frame assembly; and a pair of struts coupled to the pivot frame assembly and fixed frame assembly, each strut in the pair of struts comprising a first end coupled to the vertical beam of the pivot frame assembly and a second end coupled to the horizontal beam of the fixed frame assembly;

wherein the pair of struts apply counteracting forces on the vertical beam of the pivot frame assembly in response to pivotal movement of the pivot frame assembly relative to the fixed frame assembly, wherein the horizontal beam of the fixed frame assembly is coupled to the rear wheels, and wherein the fixed frame assembly is configured to remain stationary relative to the rear wheels.

2. The support frame assembly of claim 1, wherein each strut in the pair of struts comprises a first longitudinal axis, the horizontal beam of the fixed frame assembly comprises a second longitudinal axis, and the vertical beam of the pivot frame assembly comprises a third longitudinal axis, wherein the pivot frame assembly is configured to adjust to an upright neutral position relative to the fixed frame assembly so that the first longitudinal axis of each strut in the pair of struts is oriented 66 degrees relative to the second longitudinal axis of the horizontal beam of the fixed frame assembly.

3. The support frame assembly of claim 2, wherein the pivot frame assembly in the upright neutral position orients the first longitudinal axis of each strut in the pair of struts 24 degrees relative to the third longitudinal axis of the vertical beam of the pivot frame assembly.

4. The support frame assembly of claim 3, wherein the vertical beam of the pivot frame assembly is pivotably mounted to a midpoint of the horizontal beam of the fixed frame assembly.

5. The support frame assembly of claim 4, wherein the pair of struts permits pivotal movement of the vertical beam of the pivot frame assembly within a range of +/−20 degrees relative to the fixed frame assembly from the upright neutral position.

* * * * *